May 10, 1927.
G. A. HULTENIUS
1,627,647
DISPENSING DEVICE
Filed June 21, 1926
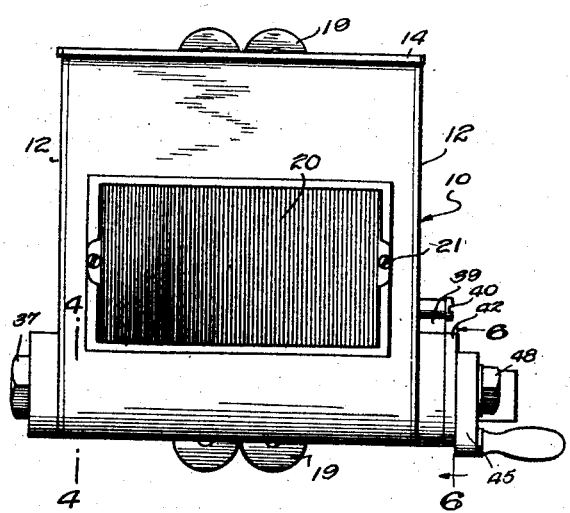
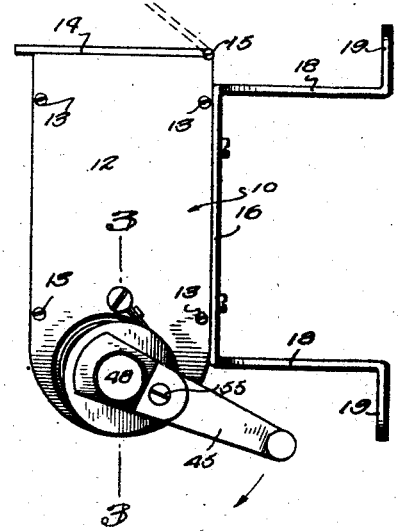
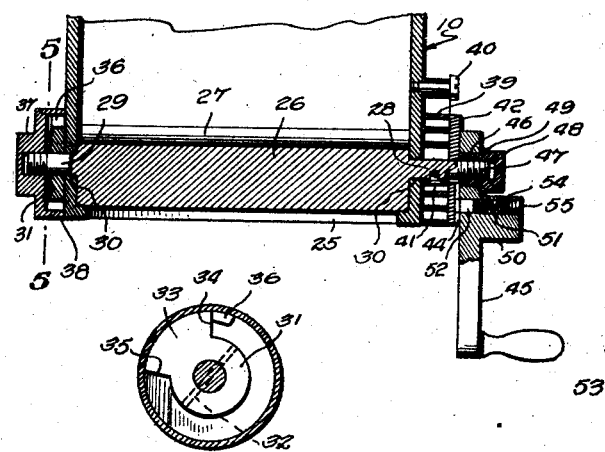
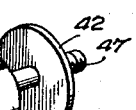
Inventor
G. A. HULTENIUS
By
Attorney Patented May 10, 1927.

1,627,647

UNITED STATES PATENT OFFICE.

GUSTAV A. HULTENIUS, OF NEWPORT, RHODE ISLAND.

DISPENSING DEVICE.

Application filed June 21, 1926. Serial No. 117,487.

This invention relates to dispensing devices and more particularly to such a device adapted to dispense matches or the like.

An important object of the invention is to provide a match dispensing device of simple construction adapted to form a fireproof match receptacle and to dispense matches or similar articles one at a time as desired.

A further object is to provide a device of the above mentioned character provided near its lower end with a dispensing device consisting of a rotatable member having a match receiving slot normally arranged in the upper face thereof, the rotatable member being adapted to be rotated through substantially a half circle to drop the match arranged in the slot.

A further object is to provide novel operating mechanism for the dispensing device.

A further object is to provide a dispensing device of the above mentioned character wherein the dispensing device itself is adapted to be rotated through substantially 180° to dispense the match and to provide an operating handle therefor adapted to be rotated through a complete circle to operate the dispensing device, the latter being releasable from the operating means when it has completed its dispensing action and being adapted to automatically return to its normal position.

A further object is to provide a rotating member consisting of a dispensing device, a spring normally holding the rotating member in normal position, and a rotatable operating handle adapted to rotate the rotatable member through substantially 180° to dispense one of the matches, the handle being adapted to release the rotatable member when the dispensing action has been completed whereby the spring is adapted to return the rotatable member to the normal position.

A further object is to provide a substantially cylindrical dispensing device having a match receiving groove normally arranged in its upper surface to receive matches from the container, the cylindrical device being rotatable through a portion of a circle to dispense a match, an operating handle for rotating the cylindrical member, and means for limiting the turning movement of the cylindrical member whereby further rotation of the operating handle is adapted to release the cylindrical member to permit it to return to normal position.

Other objects and advantages of the invention will be apparent during the course of the following description.

In the accompanying drawings I have shown one embodiment of the invention. In this showing, Figure 1 is a front elevation of the device, Figure 2 is a side elevation of the same, Figure 3 is a detail section on line 3—3 of Figure 2, Figure 4 is a similar view on line 4—4 of Figure 1, Figure 5 is a similar view on line 5—5 of Figure 3, Figure 6 is a similar view on line 6—6 of Figure 1, Figure 7 is a detail perspective of the dispensing device, and, Figure 8 is a detail perspective of the operating pawl for the dispensing device.

Referring to the drawings, the numeral 10 designates a match container or casing as a whole comprising front and rear walls 11 and preferably separate end walls 12, the latter being secured to the body of the container by screws 13 as shown in Figure 2. The container is adapted to be covered by a lid 14 hinged thereto as at 15. A suitable bracket 16 is secured to one of the side walls 11 by screws 17. This bracket is provided with rearwardly extending arms 18 having outwardly turned ends 19 adapted to be secured against any suitable supporting surface. If desired, the container may be provided on its front face with a grooved plate 20 secured to the container by screws 21, to provide a scratching surface for the matches. As shown in Figures 2 and 4, the container 10 is provided with a curved lower portion 22 having a substantially cylindrical opening 23 therein. The inner surfaces of the front and rear walls 11 are curved inwardly as at 24 for a purpose to be described. The lower end of the casing is provided with an elongated opening 25 through which matches are adapted to be dispensed.

A dispensing member 26 is rotatably supported in the opening 23 as shown. The dispensing member is substantially cylindrical and is provided with a match receiving groove 27 normally arranged in the position shown in Figure 4. The dispensing device is provided at its ends with trunnions 28 and 29 extending through openings 30 formed in the end walls 12 of the container.

As shown in Figures 3 and 7, the trunnion 29 is provided outwardly of the casing with a plate 31 secured to the trunnion by a pin 32. The plate is provided with a lug 33 having end faces 34 and 35 adapted under different conditions to engage a stop 36 projecting outwardly from one of the end plates 12. A cap 37 may be threaded on the end of the trunnion 29, as shown in Figure 3, and this cap is provided with a cylindrical flange 38, the ends of which project inwardly against the adjacent end wall 12.

The opposite trunnion 28 is elongated as shown in Figure 3. A spring 39 surrounds the trunnion adjacent the casing and one end of the spring is secured to the casing by a screw or other fastening device 40. The inner end of the spring is secured by a screw or the like 41 to the trunnion 28. An operating plate 42 surrounds the trunnion 28 adjacent the outer edge of the spring and this plate is secured to the trunnion 28 to rotate therewith by a key 43 or any other suitable fastening means. This plate is provided with a radial groove 44 for a purpose to be described.

An operating handle 45 is adapted to rotate the member 26. The handle is provided in its inner end with an opening 46 through which the threaded end 47 of the trunnion 28 extends, the opening being substantially larger than the trunnion as shown. A sleeve 48 is arranged in the opening 42 and is threaded on the end 47 of the trunnion 28. The sleeve 48 is provided with a flange 49 which contacts with the outer face of the operating handle. The handle is provided with a boss 50 having an opening 51 extending therethrough as shown in Figure 3. An operating pawl 52 is slidable in the inner end of the opening 51 and is provided with a tooth 53 at its inner end. A spring 54 normally projects the pawl inwardly and a threaded plug 55 contacts with the outer end of the spring. It will be obvious that the inner end of the opening 51 corresponds in shape to the cross sectional shape of the pawl 52.

The operation of the device is as follows:

The lid 14 is raised and the container is filled with matches or other similar articles, the matches lying lengthwise of the casing and parallel to the groove 27 as will be obvious. The curved surfaces 24 tend to feed the matches inwardly toward the dispensing device as will be apparent, one of the matches always being retained in the groove 27. When it is desired to dispense one of the matches, the handle 45 is rotated in a clockwise direction as viewed in Figure 2. With the tooth 53 of the pawl arranged in the groove 44, as shown in Figure 3, rotation of the handle will cause rotation of the dispensing device 26. The tension of the spring 54 may be adjusted by rotating the plug 55 whereby the tooth 53 may be held in proper operating engagement with the groove 44. The rotating action of the handle therefore rotates the dispensing device 26 thus carrying with it one of the matches arranged in the groove 27. This action is continued until the groove 27 registers with the lower opening 25, whereupon the match will drop therethrough. During the rotating action referred to it will be obvious that the spring 39 is placed under increasing tension, and at the point where the match is dispensed, the face 35 of the lug 33 will engage the stop 36 thus preventing further movement of the dispensing device. Further rotation of the handle 45 then causes the tooth 53 of the pawl 52 to be pressed inwardly against the tension of the spring 54 thus releasing the dispensing device 26, and the spring 39 then unwinds, rotating the dispensing device in the opposite direction until the face 34 of the lug 33 contacts with the stop 36. Movement of the handle beyond the dispensing point is continued until the tooth of the pawl 52 again drops into the groove 44. The device is then in a normal position ready to dispense another match. It will be obvious that the device conveniently may be operated by holding the left hand beneath the opening 25 to receive the match, and rotating the handle 45 with the right hand.

From the foregoing it will be apparent that the present device is extremely simple in construction and easy to operate and since the device is preferably formed entirely of metal, the danger of fire from ignited matches is greatly minimized.

It is to be understood that the form of my invention herewith shown and described is to be taken as a preferred example of the same and that various changes in the shape, size, and arrangement of parts may be resorted to without departing from the spirit of the invention or the scope of the subjoined claims.

I claim:

1. A device of the character described comprising a container, a rotatable dispensing device arranged in the lower portion of said container, said dispensing device being provided with an article receiving recess, said container being provided in its lower portion with an opening through which articles are adapted to be dispensed from said recess when said dispensing device is rotated to operative position, means for limiting the turning movement of said dispensing device to operative position for dispensing the articles, an operating handle for said dispensing device and means adapted to engage said handle with said dispensing device during partial rotation thereof and to permit rotation of said handle independently of said dispensing device after said dispensing device has reached operative position.

2. A device of the character described comprising a container having an opening in the lower end, a dispensing device rotatably supported in the lower portion of said container, spring means tending to retain said dispensing device in normal position, said dispensing device being provided with an article receiving recess normally arranged in the upper portion thereof to receive articles from said container, said dispensing device being movable to an operative position with said recess communicating with the opening in said container to dispense articles therethrough, means for limiting the movement of said dispensing device to operative position, an operating handle for said dispensing device, and releasable means adapted to engage said handle with said dispensing device during partial rotation thereof and to permit rotation of said handle independently of said dispensing device after said dispensing device has reached operative position.

3. A device of the character described comprising a container provided in its lower portion with an elongated opening, a rotatable dispensing device arranged in the lower portion of said container, a spring adapted to hold said dispensing device in normal position, said dispensing device being provided with an elongated article receiving groove normally arranged in the upper portion of said dispensing device and communicating with the interior of said container to receive articles therefrom, said dispensing device being rotatable through a portion of a circle to operative position to bring said groove into registration with said opening to dispense articles therethrough, means arranged adjacent one end of said casing and associated with said dispensing device for limiting the turning movement thereof between normal and operative positions, an operating handle rotatable through a complete circle, and releasable means connected between said operating handle and said dispensing device for moving the latter from normal to operative position, said releasable means being adapted to release said dispensing device to permit said spring to return it to normal position upon continued movement of said handle beyond the operative position of said dispensing device.

4. A device of the character described comprising a container having an opening in its lower portion, a dispensing device rotatable in the lower portion of said container and provided with an article receiving groove normally communicating with the interior of said container, said dispensing device being rotatable through a portion of the circle to operative position to bring said groove into registration with said opening to dispense articles therethrough, means for limiting the turning movement of said dispensing device between its normal and operative positions, a spring tending to hold said dispensing device in normal position, a plate carried by said dispensing device externally of said casing, an operating handle arranged adjacent said plate and rotatable through a complete circle, and releasable means connecting said operating handle to said plate to effect movement of said dispensing device from normal to operative position upon rotation of said handle, said releasable means being adapted to release said handle from said plate upon movement of said operating handle beyond the operative position of said dispensing device to permit said spring to return said dispensing device to normal position.

5. A device constructed in accordance with claim 4 wherein said releasable means comprises a pawl slidably mounted in said handle, said plate being provided with a groove normally receiving a portion of said pawl and a spring normally urging said pawl toward said plate.

6. A device constructed in accordance with claim 4 wherein the means for limiting the turning movement of said dispensing device comprises a stop carried by said casing, and a lug carried by said dispensing device, said lug being provided with a pair of faces adapted to engage opposite sides of said stop.

7. A device of the character described, comprising a container having an elongated opening in its bottom, a dispensing device mounted for rotation in the lower portion of said container and provided with an elongated groove arranged parallel to said opening and normally communicating with the interior of said container to receive articles therefrom, said dispensing device being rotatable to operatve position wherein said groove communicates with said opening to dispense articles therethrough, said dispensing device being provided with trunnions projecting through said casing, a stop carried by said casing adjacent one of said trunnions, a lug carried by said last mentioned trunnion and provided with a pair of faces adapted to limit the turning movement of said dispensing device between normal and operative positions, a torsion spring secured at one end to the other of said trunnions, the opposite end of said spring being secured to said casing, said spring being adapted normally to maintain said dispensing device in normal position, a plate carried by said last mentioned trunnion and provided on its outer face with a radial groove, an operating handle rotatably mounted on said last mentioned trunnion adjacent said plate, said handle being provided with an opening, a pawl slidably mounted in said opening and provided with a tooth normally engaging within said radial groove, and a coil spring arranged in the opening in said handle and urging said pawl to normal position.

In testimony whereof I affix my signature.

GUSTAV A. HULTENIUS.